US012630697B2

(12) United States Patent
He et al.

(10) Patent No.: US 12,630,697 B2
(45) Date of Patent: May 19, 2026

(54) POLYAMINOSILOXANE WATER TREE REPELLANT FOR ELECTRICAL INSULATION

(71) Applicants: Dow Global Technologies LLC, Midland, MI (US); Dow Silicones Corporation, Midland, MI (US)

(72) Inventors: Chao He, Shanghai (CN); Yabin Sun, Shanghai (CN); Qian Gou, Phoenixville, PA (US); Xiaohong Zong, Shanghai (CN); Jeffrey M. Cogen, Flemington, NJ (US); Timothy J. Person, Pottstown, PA (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 554 days.

(21) Appl. No.: 18/251,265

(22) PCT Filed: Oct. 29, 2020

(86) PCT No.: PCT/CN2020/124808
§ 371 (c)(1),
(2) Date: May 1, 2023

(87) PCT Pub. No.: WO2022/087959
PCT Pub. Date: May 5, 2022

(65) Prior Publication Data

US 2023/0407063 A1 Dec. 21, 2023

(51) Int. Cl.
*C08L 23/04* (2006.01)
*C08K 5/14* (2006.01)

(52) U.S. Cl.
CPC ................ *C08L 23/04* (2013.01); *C08K 5/14* (2013.01); *C08L 2207/066* (2013.01); *C08L 2312/00* (2013.01)

(58) Field of Classification Search
CPC ............... C08L 23/04; C08L 2207/066; C08L 2312/00; C08L 23/12; C08L 2203/202; C08L 83/08; C08L 83/04; C08K 5/14; C08K 5/13; H01B 3/441; C08G 77/26
See application file for complete search history.

(56) References Cited

U.S. PATENT DOCUMENTS

| | | | |
|---|---|---|---|
| 4,376,180 | A | 3/1983 | Turbett et al. |
| 5,034,278 | A | 7/1991 | Turbett |
| 10,513,625 | B2 | 12/2019 | Sun et al. |
| 11,459,411 | B2 | 10/2022 | Sun et al. |

FOREIGN PATENT DOCUMENTS

| | | | |
|---|---|---|---|
| CN | 101445628 | A | 6/2009 |
| CN | 102057446 | A | 5/2011 |
| CN | 104603192 | A | 5/2015 |
| CN | 111051411 | A | 4/2020 |
| CN | 111065672 | A | 4/2020 |
| EP | 0023239 | A2 | 11/1982 |
| GB | 2055854 | | 10/1983 |
| JP | H05-258612 | A | 10/1993 |
| JP | H07-216147 | | 8/1995 |
| JP | H11-297125 | | 10/1999 |
| JP | 2007-103247 | A | 4/2007 |

OTHER PUBLICATIONS

PCT/CN/2020-124808 International Search Report Dated May 16, 2021.

*Primary Examiner* — Angela C Scott
(74) *Attorney, Agent, or Firm* — Boyle Fredrickson S.C.

(57) ABSTRACT

The present disclosure provides a composition. In embodiment, the composition is a crosslinkable composition and includes an ethylene-based polymer, a polyaminosiloxane (PAS), and optionally a peroxide. The polyaminosiloxane (PAS) has the Formula (I) $[RSi(OZ)_2O_{1/2}]_q$ $[RSi(OZ)O_{2/2}]_m$ $[RSiO_{3/2}]_n$ wherein R is a $C_6$-$C_{20}$ aminoalkyl group with a phenyl moiety, Si is a silicon atom, O is an oxygen atom, Z is a hydrogen atom or a $C_1$-$C_{10}$ hydrocarbonyl group, q, m, and n each individually is Rr an integer from 2 to 1,000,000; and 1/2 denotes an end block structure of Formula (II), 2/2 denotes a linear structure of Formula (III), and 3/2 denotes a branched structure of Formula (IV). Also disclosed is a crosslinked composition formed from the crosslinkable composition.

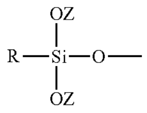

(II)

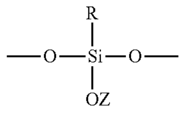

(III)

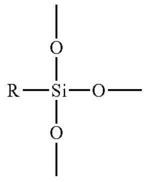

(IV)

10 Claims, No Drawings

POLYAMINOSILOXANE WATER TREE REPELLANT FOR ELECTRICAL INSULATION

BACKGROUND

Known is cross-linked ethylene polymer (XLPE) for the insulation of electrical wire and cable. As an insulator, XLPE, provides various physical and electrical properties, such as resistance to mechanical cut through, stress crack resistance and dielectric failure.

XLPE insulation in medium voltage (MV, 5-69 kV) cable and high voltage (HV, 70-225 kV) cable and extra high voltage (EHV, >225 kV) cable, in particular, are susceptible to the phenomena of treeing. The term "treeing" is a deterioration of the electrical insulation material that has the appearance of a tree-like path through the insulation material, the XLPE. Treeing is problematic as it is an electrical breakdown of the XLPE insulation. "Water trees" develop from water, voids, contaminants and/or defects present within the insulation material under alternating electric field. Water trees grow in the direction of the electrical field and emanate from imperfections which have the effect of increasing the electrical stress at local sites. The branches of water trees are narrow, on the order of 0.05 microns. Water trees increase in length with time, frequency and increasing voltage. Water trees are detrimental because they are electrically conductive and reduce the insulative capacity of the insulation layer, which can eventually cause cable break down.

"Electrical trees" are the result of internal electrical discharges that decompose the insulation material. Electrical trees emanate from localized heating, thermal decomposition, mechanical damage due to electrical stress, small voids, and/or air inclusions around contaminants.

The art recognizes the need for wire and cable insulation material resistant to treeing. Further recognized is the need for XPLE insulation material resistant to treeing, the XLPE having low dissipation factor, while maintaining suitable crosslink-ability to maintain mechanical strength, crack resistance, and dielectric failure.

SUMMARY

The present disclosure provides a composition. In embodiment, the composition is a crosslinkable composition and includes an ethylene-based polymer, a polyaminosiloxane (PAS), and optionally a peroxide. The polyaminosiloxane (PAS) has the Formula (I)

$$[RSi(OZ)_2O_{1/2}]_q[RSi(OZ)O_{2/2}]_m[RSiO_{3/2}]_n$$

wherein
R is a $C_6$-$C_{20}$ aminoalkyl group with a phenyl moiety,
Si is a silicon atom,
O is an oxygen atom,
Z is a hydrogen atom or a $C_1$-$C_{10}$ hydrocarbonyl group,
q, m, and n each individually is an integer from 2 to 1,000,000; and
1/2 denotes an end block structure of Formula (II)

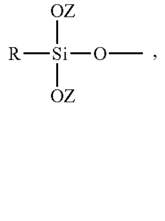

2/2 denotes a linear structure of Formula (III)

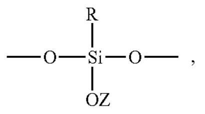

and
3/2 denotes a branched structure of Formula (IV)

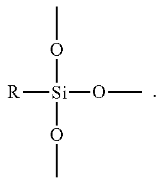

The present disclosure provides another composition. In an embodiment, a crosslinked composition is provided and includes an ethylene-based polymer, and an polyaminosiloxane (PAS). The polyaminosiloxane (PAS) has the Formula (I)

$$[RSi(OZ)_2O_{1/2}]_q[RSi(OZ)O_{2/2}]_m[RSiO_{3/2}]_n$$

wherein
R is a $C_6$-$C_{20}$ aminoalkyl group with a phenyl moiety,
Si is a silicon atom,
O is an oxygen atom,
Z is a hydrogen atom or a $C_1$-$C_{10}$ hydrocarbonyl group,
q, m, and n each individually is an integer from 2 to 1,000,000; and
1/2 denotes an end block structure of Formula (II)

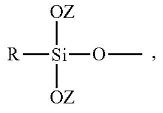

2/2 denotes a linear structure of Formula (III)

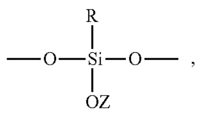

and
3/2 denotes a branched structure of Formula (IV)

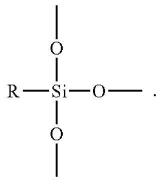

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure).

The numerical ranges disclosed herein include all values from, and including, the lower and upper value. For ranges containing explicit values (e.g., from 1 or 2, or 3 to 5, or 6, or 7), any subrange between any two explicit values is included (e.g., the range 1-7 above includes subranges of from 1 to 2; from 2 to 6; from 5 to 7; from 3 to 7; from 5 to 6; etc.).

Unless stated to the contrary, implicit from the context, or customary in the art, all parts and percents are based on weight and all test methods are current as of the filing date of this disclosure.

An "alkyl group" is a saturated linear, cyclic, or branched hydrocarbon group. Nonlimiting examples of suitable alkyl groups include methyl, ethyl, n-propyl, i-propyl, n-butyl, t-butyl, i-butyl (or 2-methylpropyl), etc.

An "amino group," is a nitrogen atom attached by a single bond to a hydrogen atom and/or to a hydrocarbon.

An "aminosiloxane," is a siloxane containing one or more primary and/or secondary amino groups.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably.

The term "ethylene monomer," or "ethylene," as used herein, refers to a chemical unit having two carbon atoms with a double bond there between, and each carbon bonded to two hydrogen atoms, wherein the chemical unit polymerizes with other such chemical units to form an ethylene-based polymer composition.

A "heteroatom" is an atom other than carbon or hydrogen. The heteroatom can be a non-carbon atom from Groups IV, V, VI and VII of the Periodic Table. Nonlimiting examples of heteroatoms include: F, N, O, P, B, S, and Si.

A "hydrocarbon" is a compound containing only hydrogen atoms and carbon atoms. A "hydrocarbonyl" (or "hydrocarbonyl group") is a hydrocarbon having a valence (typically univalent). A hydrocarbon can have a linear structure, a cyclic structure, or a branched structure.

The term "linear low density polyethylene," (or "LLDPE") as used herein, refers to a linear ethylene/α-olefin copolymer containing heterogeneous short-chain branching distribution comprising units derived from ethylene and units derived from at least one $C_3$-$C_{10}$ α-olefin, or $C_4$-$C_8$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

The term "low density polyethylene," (or LDPE) as used herein, refers to a polyethylene having a density from 0.910 g/cc to less than 0.940 g/cc, or from 0.918 g/cc to 0.930 g/cc, and long chain branches with a broad molecular weight distribution (MWD)—i.e., "broad MWD" from 4.0 to 20.0.

An "olefin" is an unsaturated, aliphatic hydrocarbon having a carbon-carbon double bond.

The term "phenyl" (or "phenyl group") is a $C_6H_5$ aromatic hydrocarbon ring having a valence (typically univalent).

The term "polymer" or a "polymeric material," as used herein, refers to a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "silane," as used herein, is a compound with one or more Si—C bonds.

A "siloxane," as used herein, is a hydrocarbon with a Si—O—Si linkage.

Test Methods

Density is measured in accordance with ASTM D792, Method B. Results are reported in grams per cubic centimeter (g/cc).

Fourier Transform Infrared Analysis ("FTIR")

Determination of the amount of terminal and internal trans double bonds per 1000 carbons (or "1000C") was done by Fourier Transform Infrared analysis ("FTIR"). Sample being analyzed is placed on Diamond/ZnSe crystal, apply appropriate pressure to acquire optimum contact, then ATR-FTIR spectrum is collected between 4000 and 650 cm-1, each sample is scanned for 8 times. The experimental settings are listed below: Resolution: 4.0 cm-1; Apodization: Strong Scan; speed: 0.20 cm/s; Detector: MIR TGS.

Gel Permeation Chromatography (GPC)

The chromatographic system consisted of a PolymerChar GPC-IR (Valencia, Spain) high temperature GPC chromatograph equipped with an internal IR5 infrared detector (IR5) and 4-capillary viscometer (DV) coupled to a Precision Detectors (Now Agilent Technologies) 2-angle laser light scattering (LS) detector Model 2040. For all absolute Light scattering measurements, the 15 degree angle is used for measurement. The autosampler oven compartment was set at 160° Celsius and the column compartment was set at 1500 Celsius. The columns used were 4 Agilent "Mixed A" 30 cm 20-micron linear mixed-bed columns. The chromatographic solvent used was 1,2,4 trichlorobenzene (CAS 120-82-1, HPLC grade from Fisher Scientific) and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene}=A\times(M_{polystyrene})^{B} \qquad \text{(EQ1)}$$

where M is the molecular weight, A has a value of 0.4315 and B is equal to 1.0.

A polynomial between $3^{rd}$ and $5^{th}$ order was used to fit the respective polyethylene-equivalent calibration points. A small adjustment to A (from approximately 0.375 to 0.440) was made to correct for column resolution and band-broadening effects such that a homopolymer polyethylene standard with a molecular weight of 120,000.

The total plate count of the GPC column set was performed with Eicosane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left(\frac{(RV_{Peak\ Max}}{\text{Peak Width at } \frac{1}{2} \text{ height}}\right)^2 \qquad \text{(EQ2)}$$

where RV is the retention volume in milliliters, the peak width is in milliliters, the peak max is the maximum height of the peak, and M height is % height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \qquad \text{(EQ3)}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 1602 Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum^{i} IR_i}{\sum^{i} \left(IR_i / M_{polyethylene_i}\right)} \qquad \text{(EQ 4)}$$

$$Mw_{(GPC)} = \frac{\sum^{i} \left(IR_i * M_{polyethylene_i}\right)}{\sum^{i} IR_i} \qquad \text{(EQ 5)}$$

$$Mz_{(GPC)} = \frac{\sum^{i} \left(IR_i * M^2_{polyethylene_i}\right)}{\sum^{i} \left(IR_i * M_{polyethylene_i}\right)} \qquad \text{(EQ 6)}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate (nominal)) for each sample by RV alignment of the respective decane peak within the sample (RV (FM Sample)) to that of the decane peak within the narrow standards calibration (RV (FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−2% of the nominal flowrate.

Flowrate (effective)=Flowrate (nominal)*(RV(FM Calibrated)/RV(FM Sample)) (EQ7)

Triple Detector GPC (TDGPC)

The chromatographic system, run conditions, column set, column calibration and calculation conventional molecular weight moments and the distribution were performed according to the method described in Gel Permeation Chromatography (GPC).

For the determination of the viscometer and light scattering detector offsets from the IR5 detector, the Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mole. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight ($MW_{(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™). Other respective moments, $Mn_{(Abs)}$ and $Mz_{(Abs)}$ are be calculated according to Equations 8-9 as follows:

$$Mn_{(Abs)} = \frac{\sum^{i} IR_i}{\sum^{i} (IR_i / M_{Absolutei})} \quad \text{(EQ 8)}$$

$$Mz_{(Abs)} = \frac{\sum^{i} (IR_i * M^2_{Absolute_i})}{\sum^{i} (IR_i * M_{Absolute_i})} \quad \text{(EQ 9)}$$

gpcBR Branching Index by Triple Detector GPC (3D-GPC)

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the infrared (IR5) chromatogram. Linear polyethylene standards are then used to establish polyethylene and polystyrene Mark-Houwink constants. Upon obtaining the constants, the two values are used to construct two linear reference conventional calibrations for polyethylene molecular weight and polyethylene intrinsic viscosity as a function of elution volume, as shown in Equations (10) and (11):

$$M_{PE}=(K_{PS}/K_{PE})^{1/\alpha_{PE}+1} \cdot M_{PS}{}^{\alpha_{PS}+1/\alpha_{PE}+1} \quad \text{(Eq. 10)}$$

$$[\eta]_{PE}=K_{PS} \cdot M_{PS}{}^{\alpha+1}/M_{PE} \quad \text{(Eq. 11).}$$

The gpcBR branching index is a robust method for the characterization of long chain branching as described in Yau, Wallace W., "Examples of Using 3D-GPC—TREF for Polyolefin Characterization," Macromol. Symp., 2007, 257, 29-45. The index avoids the "slice-by-slice" 3D-GPC calculations traditionally used in the determination of g' values and branching frequency calculations, in favor of whole polymer detector areas. From 3D-GPC data, one can obtain the sample bulk absolute weight average molecular weight (Mw, Abs) by the light scattering (LS) detector, using the peak area method. The method avoids the "slice-by-slice" ratio of light scattering detector signal over the concentration detector signal, as required in a traditional g' determination.

With 3D-GPC, sample intrinsic viscosities are also obtained independently using Equation (8). The area calculation in Equation (5) and (8) offers more precision, because, as an overall sample area, it is much less sensitive to variation caused by detector noise and 3D-GPC settings on baseline and integration limits. More importantly, the peak area calculation is not affected by the detector volume offsets. Similarly, the high-precision sample intrinsic viscosity (IV) is obtained by the area method shown in Equation (12):

$$IV_w = \frac{\sum_i c_i IV_i}{\sum_i c_i} = \frac{\sum_i \eta_{sp_i}}{\sum_i c_i} = \frac{\text{Viscometer Area}}{\textit{Conc.}\ \text{Area}} \quad \text{(Eq. 12)}$$

where $\eta_{spi}$ stands for the specific viscosity as acquired from the viscometer detector.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume:

$$[\eta]_{cc} = \frac{\sum_i c_i IV_{i,cc}}{\sum_i c_i} = \frac{\sum_i c_i K (M_{i,cc})^a}{\sum_i c_i} \quad \text{(Eq. 13)}$$

Equation (14) is used to determine the gpcBR branching index:

$$gpcBR = \left[\left(\frac{[\eta]_{cc}}{[\eta]}\right)\left(\frac{M_w}{M_{w,cc}}\right)^{\alpha PE} - 1\right] \quad \text{(Eq. 14)}$$

wherein [η] is the measured intrinsic viscosity, $[\eta]_{cc}$ is the intrinsic viscosity from the conventional calibration, Mw is the measured weight average molecular weight, and $Mw,_{cc}$ is the weight average molecular weight of the conventional calibration. The weight average molecular weight by light scattering (LS) is commonly referred to as "absolute weight average molecular weight" or "Mw, Abs." The Mw,cc using conventional GPC molecular weight calibration curve ("conventional calibration") is often referred to as "polymer chain backbone molecular weight," "conventional weight average molecular weight," and "$Mw,_{GPC}$."

All statistical values with the "cc" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for α and Log K for the determination of gpcBR in this particular case are 0.725 and −3.391, respectively, for polyethylene, and 0.722 and −3.993, respectively, for polystyrene. These polyethylene coefficients were then entered into Equation 13.

Once the K and α values have been determined using the procedure discussed previously, the procedure is repeated using the branched samples. The branched samples are analyzed using the final Mark-Houwink constants obtained from the linear reference as the best "cc" calibration values are applied.

The interpretation of gpcBR is straight forward. For linear polymers, gpcBR calculated from Equation (14) will be close to zero, since the values measured by LS and viscometry will be close to the conventional calibration standard. For branched polymers, gpcBR will be higher than zero, especially with high levels of long chain branching, because the measured polymer molecular weight will be higher than the calculated Mw,cc, and the calculated IVcc will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

Samples were dissolved in THF with the concentration about 5 mg/mL. Sample solutions were filtered by 0.45 μm PTFE membrane before SEC analysis. Instrument: Agilent 1200; Columns: Two Mixed E columns (7.8×300 mm); Column Temperature: 35° C.; Mobile Phase: Tetrahydrofuran; Flow: 1.0 mL/min; Injection volume: 50 μL; Detector: Agilent Refractive Index detector, 35° C.; Software: Agilent GPC software; Calibration Curve: PL Polystyrene Narrow standards (Part No.: 2010-0101) with Polyol equivalent molecular weights ranging from 11450 to 162 g/mol.

Melt Index

The term "melt index," or "MI" as used herein, refers to the measure of how easily a thermoplastic polymer flows when in a melted state. Melt index, or $I_2$, is measured in accordance by ASTM D 1238, Condition 190° C./2.16 kg, and is reported in grams eluted per 10 minutes (g/10 min). The 110 is measured in accordance with ASTM D 1238, Condition 190° C./10 kg, and is reported in grams eluted per 10 minutes (g/10 min).

Moving Die Rheometer (MDR) Test

MDR test was conducted on MDR2000 (Alpha Technologies) at 180° C. for 20 minutes while monitoring change in torque according to ASTM D5289-12, Standard Test Method for Rubber Property-Vulcanization Using Rotorless Cure Meters. Designate the lowest measured torque value as "ML", expressed in deciNewton-meter (dN-m). As curing or crosslinking progresses, the measured torque value increases, eventually reaching a maximum torque value. Designate the maximum or highest measured torque value as "MH", expressed in dN-m. All other things being equal, the greater the MH torque value, the greater the extent of crosslinking. Determine the T90 crosslinking time as being the number of minutes required to achieve a torque value equal to 90% of the difference MH minus ML (MH-ML), i.e., 90% of the way from ML to MH. The shorter the T90 crosslinking time, i.e., the sooner the torque value gets 90% of the way from ML to MH, the faster the curing rate of the test sample. Conversely, the longer the T90 crosslinking time, i.e., the more time the torque value takes to get 90% of the way from ML to MH, the slower the curing rate of the test sample.

Nuclear Magnetic Resonance ($^1$H NMR)

The term "nuclear magnetic resonance," or "NMR" or "Proton NMR," as used herein, refers to a spectral analysis of a material or compound that provides information regarding the chemical composition and structure of the material or compound. About 50 mg of sample was dissolved in 0.7 mL of $CDCl_3$ at room temperature to a homogenous solutions. The 1H spectrum was acquired at room temperature on a Bruker 400 MHz (1H frequency) spectrometer. A 5 mm BBFO probe was employed. Chemical shifts are given in parts per million (ppm) relative to Tetramethylsilane (TMS) and referenced to residual signal for the protonated solvent ($CDCl_3$, δ 7.26 ppm). The relaxation delay was set at 15 sec for 16 scans.

About 200 mg of sample was dissolved in 0.6 mL of deuterated chloroform with 0.025 M chromium(III) acetylacetonate ($Cr(acac)_3$) at room temperature to a homogenous solutions. The $^{13}$C spectrum was acquired at room temperature on a Bruker AVANCE III 400 MHz spectrometer operating at a $^{13}$C resonance frequency of 100.6 MHz. A 5 mm BBFO probe was employed. Chemical shifts are given in parts per million (ppm) relative to Tetramethylsilane (TMS) and referenced to residual signal for the protonated solvent ($CDCl_3$: δC 77 ppm). Inverse gated decoupling was used as the pulse program for quantitative $^{13}C$ NMR. The relaxation delay was set at 10 sec for 4000 scans.

Approximately 40% (v/v) of test article solution in deuterated chloroform ($CDCl_3$) containing Chromium(III) acetylacetonate ($Cr(acac)_3$) was prepared in a 16 mm silicone free NMR tube. The concentration of $Cr(acac)_3$ in the sample solution was ~0.02 M. The purpose of adding the $Cr(acac)_3$ was to act as a T1 relaxation reagent which improves the rate at which repetitive pulses may be acquired. The prepared sample solution was observed as a clear, homogenous, purple solution the purple color is due to $Cr(acac)_3$. The $^{29}Si$ NMR spectrum was acquired at room temperature on an Agilent Mercury 400, FT-NMR Spectrometer with 16 mm silicon free switchable $^{13}C/^{29}Si$ probe. Inverse gated decoupling was used as the pulse program for quantitative $^{29}Si$ NMR. The relaxation delay was set as 13 sec for 1000 scans. For $^{29}Si$ NMR experiment, tetramethylsilane (TMS) was used as an external reference.

Water-Tree Growth Test Method: was measured in accordance with ASTM D6097-01a, Standard Test Method for Relative Resistance to Vented Water-Tree Growth in Solid Dielectric Insulating Materials. This test method covers the relative resistance to water-tree growth in solid translucent thermoplastic or crosslinked electrical insulating materials. It is especially applicable to extruded polymeric insulation materials useful in medium-voltage power cables. Ten compression-molded disk specimens, each containing a controlled conical-shaped defect, are subjected to an applied voltage of 5 kilovolts (kV) at 1 kilohertz (kHz) and 23°±2° C. in an aqueous conductive solution of 0.01 Normal sodium chloride for 30 days. The controlled conical-shaped defect is created by a sharp needle with an included angle of 600 and a tip radius of 3 micrometers (μm). The electrical stress at the defect tip is thereby enhanced and is estimated by the Mason's Hyperbolic point-to-plane stress enhancement equation. This enhanced electrical stress initiates the formation of a vented water-tree grown from the defect tip. Each of the resulting treed specimens so produced is stained and sliced. The water-tree length and point-to-plane specimen thickness are measured under a microscope and used to calculate a ratio that is defined as the resistance to water-tree growth. Water-tree length (WTL) is the fraction of the thickness in the insulation material through which the water tree has grown. The lower the value of WTL, the better the water tree resistance. WTL is reported in percent (%).

DETAILED DESCRIPTION

1. Crosslinkable Composition

The present disclosure provides a composition. In an embodiment, the composition is a crosslinkable composition and includes an ethylene-based polymer, a polyaminosiloxane (PAS), and optionally a peroxide. The polyaminosiloxane has the structure of Formula (I)

$$[RSi(OZ)_2O_{1/2}]_q[RSi(OZ)O_{2/2}]_m[RSiO_{3/2}]_n \quad \text{(Formula I)}$$

wherein

R is a $C_6$-$C_{20}$ aminoalkyl group with a phenyl moiety,

Si is a silicon atom,

O is an oxygen atom,

Z is a hydrogen atom or a $C_1$-$C_{10}$ hydrocarbonyl group, q, m, and n each individually is an integer from 2 to 1,000,000; and 1/2 denotes an end block structure of Formula (II)

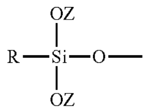
,

2/2 denotes a linear structure of Formula (III)

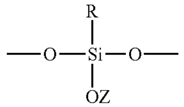
, and

3/2 denotes a branched structure of Formula (IV)

Formula (IV)

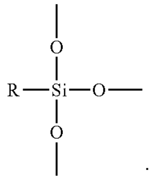
.

The present disclosure provides a composition that is a crosslinkable composition. A "crosslinkable composition," as used herein, is a composition containing an ethylene-based polymer and one or more additives (a free radical initiator or organic peroxide, for example) that enhance the ethylene-based polymer's ability to crosslink when subjected to crosslinking conditions (e.g., heat, irradiation, and/or UV light). After being subjected to the crosslinking conditions (e.g., "after crosslinking" or "after curing"), the crosslinkable composition becomes a "crosslinked composition" containing ethylene-based polymer that is crosslinked and is structurally and physically distinct to the crosslinkable composition.

The crosslinkable composition includes an ethylene-based polymer. Nonlimiting examples of suitable ethylene-based polymer include ethylene homopolymer, ethylene/α-olefin copolymer (linear or branched), high density polyethylene ("HDPE"), low density polyethylene ("LDPE"), linear low density polyethylene ("LLDPE"), medium density polyethylene ("MDPE"), and combinations thereof. The crosslinkable composition contains from 50 wt % to 99 wt %, or from 80 wt % to 99 wt %, or from 90 wt % to 99 wt %, or from 95 wt % to 99 wt % of the ethylene-based polymer, based on total weight of the crosslinkable composition.

In an embodiment, the ethylene-based polymer is an ethylene/$C_3$-$C_{20}$ α-olefin copolymer, or an ethylene/$C_4$-$C_8$ α-olefin copolymer having an α-olefin content from 1 wt % to 45 wt %, or from 5 wt % to 40 wt %, or from 10 wt % to 35 wt %, or from 15 wt % to 30 wt %, based on the total weight of the ethylene/$C_3$-$C_{20}$ α-olefin copolymer. Nonlimiting examples of $C_3$-$C_{20}$ α-olefin include propene, butene, 4-methyl-1-pentene, hexene, octene, decene, dodecene, tetradecene, hexadecene, and octadecene. The α-olefin can also have a cyclic structure such as 3 cyclohexyl-1-propene (allyl cyclohexane) and vinyl cyclohexane. Nonlimiting examples of suitable ethylene/$C_3$-$C_{20}$ α-olefin copolymer include ethylene/propylene copolymer, ethylene/butene copolymer, ethylene/hexene copolymer, and ethylene/octene copolymer.

In an embodiment, the ethylene-based polymer includes a non-conjugated diene comonomer. Suitable non-conjugated dienes include straight-chain, branched-chain or cyclic hydrocarbon dienes having from 6 to 15 carbon atoms. Examples of suitable non-conjugated dienes include, but are not limited to, straight-chain acyclic dienes, such as 1,4-hexadiene, 1,6-octadiene, 1,7-octadiene, and 1,9-decadiene; branched-chain acyclic dienes, such as 5-methyl-1,4-hexadiene, 3,7-dimethyl-1,6-octadiene, 3,7-dimethyl-1,7-octadiene, and mixed isomers of dihydromyricene and dihydroocinene; single-ring alicyclic dienes, such as 1,3-cyclopentadiene, 1,4-cyclohexadiene, 1,5-cyclooctadiene, and 1,5-cyclododecadiene; and multi-ring alicyclic fused and bridged-ring dienes, such as tetrahydroindene, methyl tetrahydroindene, dicyclopentadiene, and bicyclo-(2,2,1)-hepta-2,5-diene; alkenyl, alkylidene, cycloalkenyl, and cycloalkylidene norbornenes, such as 5-methylene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene.

In an embodiment, the ethylene-based polymer is an ethylene/propylene/diene terpolymer (or "EPDM"). Nonlimiting examples of suitable dienes include 1,4-hexadiene ("HD"), 5-ethylidene-2-norbornene ("ENB"), 5-vinylidene-2-norbornene ("VNB"), 5-methylene-2-norbornene ("MNB"), and dicyclopentadiene ("DCPD"). The diene content of the EPDM is from 0.1 wt % to 10.0 wt %, or from 0.2 wt % to 5.0 wt %, or from 0.3 wt % to 3.0 wt %, based on total weight of the EPDM.

In an embodiment, the ethylene-based polymer includes units derived from ethylene and units derived from at least one comonomer having the Structure (A):

Structure (A)

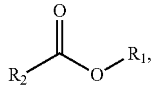

wherein $R_1$ is a $C_1$-$C_4$ hydrocarbonyl group, and $R_2$ is a $C_1$-$C_2$ hydrocarbonyl group.

Nonlimiting examples of suitable $R_1$ groups include unsubstituted $C_1$-$C_4$ alkyl groups and unsubstituted $C_2$-$C_4$ alkenyl groups, including methyl groups, ethyl groups, propyl groups, butyl groups, ethenyl groups, propenyl groups, and butenyl groups. The unsubstituted $C_1$-$C_4$ alkyl groups and unsubstituted $C_2$-$C_4$ alkenyl groups may be branched or linear. In an embodiment, the $R_1$ group is an unsubstituted linear $C_1$-$C_4$ alkyl group or an unsubstituted $C_2$ alkenyl group, including, for example, a methyl group, an ethyl group, a propyl group, a butyl group or an ethenyl group. In a further embodiment, the $R_1$ group is selected from a methyl group, an ethyl group, a butyl group and an ethenyl group. In an embodiment, the $R_1$ group is selected from a methyl group, an ethyl group, and a linear butyl group.

Nonlimiting examples of suitable $R_2$ groups include unsubstituted $C_1$-$C_2$ alkyl groups and unsubstituted $C_2$ alkenyl groups, including methyl groups, ethyl groups, and ethenyl groups. In an embodiment, the $R_2$ group is selected from a methyl group and an unsubstituted ethene group.

In an embodiment, the ethylene-based polymer includes:

(i) one or more hydrolyzable silyl groups, hydrolyzable silyl group is independently a monovalent group of formula $(R^2)_m (R^3)_{3-m}$ Si—, wherein subscript m is an integer of 1, 2, or 3; each $R^2$ is independently H, HO—, $(C_1$-$C_6)$alkoxy, $(C_2$-$C_6)$carboxy, phenoxy, $(C_1$-$C_6)$alkyl-phenoxy, $((C_1$-$C_6)$alkyl)N—, $(C_1$-$C_6)$alkyl(H)C═NO—, or $((C_1$-$C_6)$alkyl$)_2$C═NO—; and each $R^3$ is independently $(C_1$-$C_6)$alkyl or phenyl;

(ii) a $C_3$-$C_{40}$ alpha-olefin comonomer; and (iii) both (i) and (ii). Each $R^2$ may be free of H and HO—, alternatively free of phenoxy and $(C_1$-$C_9)$alkylphenoxy. Each $R^2$ may be independently $(C_1$-$C_6)$alkoxy, $(C_2$-$C_6)$carboxy, $((C_1$-$C_6)$alkyl$)_2$N—, $(C_1$-$C_9)$alkyl(H)C═NO—, or $((C_1$-$C_9)$alkyl$)_2$C═NO—; alternatively $(C_1$-$C_9)$alkoxy; alternatively $(C_2$-$C_9)$carboxy; alternatively $((C_1$-$C_9)$alkyl$)_2$N—; alternatively $(C_1$-$C_9)$alkyl(H)C═NO—; alternatively $((C_1$-$C_9)$alkyl$)_2$C═NO—.

In an embodiment, the ethylene-based polymer is a low density polyethylene (LDPE) homopolymer having one, some, or all of the following properties:

(i) a density from 0.91 to 0.93; and/or (ii) a melt index from 0.5 g/10 min to 10.0 g 10 min, or from 1.0 g/10 min to 5.0 g/10 min.

The crosslinkable composition includes a polyaminosiloxane. A "polyaminosiloxane," as used herein, is the condensation product of one or more aminoalkylsilane precursors hydrolyzed in the presence of water at elevated temperature (60-100° C.) and subsequently subjected to condensation to form polysiloxane linkages, —Si—O—Si—, between units of the aminoalkylsilane precursors. In this way, the polyaminosiloxane is a chain composed of many (i.e., "poly") aminoalkylsilane precursors linked, or otherwise bonded, to each other by —Si—O—Si— linkages. The polyaminosiloxane (interchangeably referred to as "PAS") has the structure of Formula (I)

$$[RSi(OZ)_2O_{1/2}]_q[RSi(OZ)O_{2/2}]_m[RSiO_{3/2}]_n$$

wherein

R is a $C_6$-$C_{20}$ aminoalkyl group with a phenyl moiety,

Si is a silicon atom,

O is an oxygen atom,

Z is a hydrogen atom or a $C_1$-$C_{10}$ hydrocarbonyl group, q is an integer from 2 to 1,000,000, or q is an integer from 5 to 100, m is an integer from 2 to 1,000,000, or m is an integer from 20 to 300, n is an integer from 2 to 1,000,000, or n is an integer from 10 to 700, 1/2 denotes an end block structure of Formula (II)

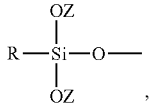

,

2/2 denotes a linear structure of Formula (III),

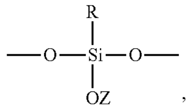

, and

3/2 denotes a branched structure of Formula (IV)

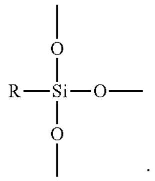

The PAS having the structure of Formula (I) includes R that is a $C_6$-$C_{20}$ aminoalkyl group with a phenyl moiety. The amino alkyl group contains one or more nitrogen atoms (N) and may be a primary amino group, and/or a secondary amino group. The phenyl moiety of the $C_6$-$C_{20}$ aminoalkyl group has the Structure (B) below:

Structure (B)

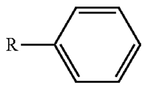

wherein R is a hydrocarbonyl group, or an aminoalkyl group.

Nonlimiting examples of suitable aminoalkylsilane precursors for the production of the PAS of Formula (I) include phenylaminomethyl)methyldimethoxysilane (CAS:17890-10-7), (aminoethylaminomethyl)phenethyltrimethoxysilane (CAS:74113-77-2), p-aminophenyltrimethoxysilane (CAS: 33976-43-1), 3-(2,4-dinitrophenylamino)propyltriethoxysilane (CAS:71783-41-0), n-phenylaminomethyltriethoxysilane (CAS:77855-73-3), n-phenylaminopropyltrimethoxysilane (CAS:3068-76-6), m-aminophenyltrimethoxysilane (CAS:70411-42-6), aminophenyltrimethoxysilane (CAS:33976-43-1/70411-42-6), 3-(n-styrylmethyl-2-aminoethylamino)propyltrimethoxysilane hydrochloride (CAS:34937-00-3), 4-(trimethoxysilylethyl)benzyltrimethylammonium chloride, and combinations thereof.

In an embodiment, the aminoalkylsilane precursor is selected from n-phenylaminopropyltrimethoxysilane (CAS: 3068-76-6) and aminophenyltrimethoxysilane (CAS:33976-43-1).

In an embodiment, the aminoalkylsilane precursor is phenylaminopropyltrimethoxysilane (CAS:3068-76-6).

In an embodiment, the aminoalkylsilane precursor is aminophenyltrimethoxysilane (CAS:33976-43-1).

The crosslinkable composition includes from 0.05 wt % to 3 wt %, or from 0.1 wt % to 2.5 wt %, or from 0.5 wt % to 2.0 wt % of the polyaminosiloxane, based on total weight of the crosslinkable composition.

In addition to the ethylene-based polymer and the PAS, the present crosslinkable composition optionally includes a free radical initiator. In an embodiment, the free radical initiator is present in the crosslinkable composition and the free radical initiator is an organic peroxide. The organic peroxide is a molecule containing carbon atoms, hydrogen atoms, and two or more oxygen atoms, and having at least one —O—O-group, with the proviso that when more than one —O—O-group is present, each —O—O-group is bonded indirectly to another —O—O-group via one or more carbon atoms, or collection of such molecules. Nonlimiting examples of suitable organic peroxide include diacylperoxides, peroxycarbonates, peroxydicarbonates, peroxyesters, peroxyketals, cyclic ketone peroxides, dialkylperoxides, ketone peroxides, and combinations thereof. The crosslinkable composition includes from greater than 0 wt % to less than 2 wt %, or from 0.1 wt % to 1.9 wt %, or from 0.2 to 1.8 wt % of the peroxide, based on total weight of the crosslinkable composition. It is understood that the aggregate of ethylene-based polymer, polyaminosiloxane, and peroxide amount to 100 wt % of the crosslinkable composition.

The organic peroxide may be a monoperoxide of formula $R^O$—O—O—$R^O$, wherein each $R^O$ independently is a ($C_1$-$C_{20}$) alkyl group or ($C_6$-$C_{20}$) aryl group. Each ($C_1$-$C_{20}$) alkyl group independently is unsubstituted or substituted with 1 or 2 ($C_6$-$C_{12}$) aryl groups. Each ($C_6$-$C_{20}$) aryl group is unsubstituted or substituted with 1 to 4 ($C_1$-$C_{10}$) alkyl groups. Alternatively, the organic peroxide may be a diperoxide of formula $R^O$—O—O—R—O—O—$R^O$, wherein R is a divalent hydrocarbon group such as a ($C_2$-$C_{10}$) alkylene, ($C_3$-$C_{10}$) cycloalkylene, or phenylene, and each $R^O$ is as defined above.

Nonlimiting examples of suitable organic peroxides include dicumyl peroxide (DCP); lauryl peroxide; benzoyl peroxide; tertiary butyl perbenzoate; di (tertiary-butyl) peroxide; cumene hydroperoxide; 2, 5-dimethyl-2, 5-di (t-butyl-peroxy) hexyne-3; 2, -5-di-methyl-2, 5-di (t-butyl-peroxy) hexane; tertiary butyl hydroperoxide; isopropyl percarbonate; alpha, alpha'-bis (tertiary-butylperoxy) diisopropylbenzene; t-butylperoxy-2-ethylhexyl-monocarbonate; 1, 1-bis (t-butylperoxy)-3, 5, 5-trimethyl cyclohexane; 2,5-dimethyl-2,5-dihydroxyperoxide; t-butylcumylperoxide; alpha, alpha'-bis (t-butylperoxy)-p-diisopropyl benzene; bis (1,1-dimethylethyl) peroxide; bis (1,1-dimethylpropyl) peroxide; 2, 5-dimethyl-2, 5-bis (1, 1-dimethylethylperoxy) hexane; 2, 5-dimethyl-2, 5-bis (1, 1-dimethylethylperoxy) hexyne; 4, 4-bis (1, 1-dimethylethylperoxy) valeric acid; butyl ester; 1, 1-bis (1, 1-dimethylethylperoxy)-3, 3, 5-trimethylcyclohexane; benzoyl peroxide; tert-butyl peroxybenzoate; di-tert-amyl peroxide (“DTAP”); bis (alpha-t-butyl-peroxyisopropyl) benzene (“BIPB”); isopropylcumyl t-butyl peroxide; t-butylcumylperoxide; di-t-butyl peroxide; 2, 5-bis (t-butylperoxy)-2, 5-dimethylhexane; 2, 5-bis (t-butylperoxy)-2, 5-dimethylhexyne-3, 1, 1-bis (t-butylperoxy)-3, 3, 5-trimethylcyclohexane; isopropylcumyl cumylperoxide; butyl 4, 4-di (tert-butylperoxy) valerate; di (isopropylcumyl) peroxide; and the like.

In an embodiment, the free radical initiator is present in the crosslinkable composition and the free radical initiator is an organic peroxide that is dicumyl peroxide (DCP).

The present crosslinkable composition may include one or more optional additives. When the additive is present, nonlimiting examples of suitable additives include antioxidant, a scorch retardant, a coagent (such as triallyl iso-cyanurate, triallyl trimellitate, triallyl cyanurate, trimethylolpropane triacrylate, trimethylolpropane trimethylacrylate, ethoxylated bisphenol A dimethacrylate, 1,6-hexanediol diacrylate, pentaerythritol tetraacrylate, dipentaerythritol pentaacrylate, N,N,N',N',N",N"-hexaallyl-1,3,5-triazine-2,4,6-triamine, tris(2-hydroxyethyl) isocyanurate triacrylate, propoxylated glyceryl triacrylate, 2,4-diphenyl-4-methyl-1-pentene, 1,3-diisopropenylbenzene, tetramethyltetravinylcyclotetrasiloxane, trivinyltrimethylcyclotrisiloxane, pentavinylpentamethylcyclopentasiloxane), a nucleating agent, a processing aid, an extender oil, carbon black, nanoparticles, a UV stabilizer, and combinations thereof.

In an embodiment, the crosslinkable composition includes one or more antioxidants. Nonlimiting examples of suitable antioxidants include bis(4-(1-methyl-1-phenylethyl)phenyl) amine (e.g., NAUGARD 445); 2,2-methylene-bis(4-methyl-6-t-butylphenol) (e.g., VANOX MBPG); 2,2'-thiobis(2-t-butyl-5-methylphenol (CAS No. 90-66-4), CAS No. 96-69-5, commercially LOWINOX TBM-6);2,2'-thiobis(6-t-butyl-4-methylphenol (CAS No. 90-66-4, commercially LOWINOX TBP-6); tris[(4-tert-butyl-3-hydroxy-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); distearylthiodipropionate ("DSTDP"); dilaurylthiodipropionate (e.g., IRGANOX PS 800); stearyl 3-(3,5-di-t-butyl-4-hydroxyphenyl)propionate (e.g., IRGANOX 1076); 2,4-bis (dodecylthiomethyl)-6-methylphenol (IRGANOX 1726); 4,6-bis(octylthiomethyl)-o-cresol (e.g. IRGANOX 1520); and 2',3-bis[[3-[3,5-di-tert-butyl-4-hydroxyphenyl]propionyl]]propionohydrazide (IRGANOX 1024); 4,4-thiobis(2-t-butyl-5-methylphenol) (also known as 4,4'-thiobis(6-tert-butyl-m-cresol); 2,2'-thiobis(6-t-butyl-4-methylphenol; tris [(4-tert-butyl-3-hydroxy-2,6-dimethylphenyl)methyl]-1,3, 5-triazine-2,4,6-trione; distearylthiodipropionate; Cyanox 1790 (CAS: 40601-76-1); Uvinul 4050 (CAS: 124172-53-8); and combinations thereof. The antioxidant is present from 0.01 wt % to 1.5 wt %, or from 0.05 wt % to 1.2 wt %, or from 0.07 wt % to 1.0 wt %, or from 0.1 wt % to 0.5 wt %, based on the total weight of the crosslinkable composition.

In an embodiment, the crosslinkable composition includes

- from 80 wt % to 99 wt %, or from 90 wt % to 99 wt % of the ethylene-based polymer;
- from 0.1 wt % to 2.0 wt %, or from 0.3 wt % to 1.0 wt % of the polyaminosiloxane (PAS); and
- from greater than 0 wt % to less than 2 wt %, or from 0.5 wt % to 1.9 wt % peroxide, wherein weight percent is based on total weight of the crosslinkable composition. It is understood that the aggregate of the ethylene-based polymer, the PAS, and the peroxide amount to 100 wt % of the crosslinkable composition.

The components of the crosslinkable composition are processed and mixed to cure the crosslinkable composition and form a crosslinked composition. Pellets of the ethylene-based polymer are fed into a mixing device (such as a Brabender mixer, for example) at a temperature from 120° C. to 180° C. to melt the ethylene-based polymer. The PAS (and any optional additives, such as antioxidant) are fed into the mixing device and melt-mixed into the ethylene-based polymer. The mixed compound composed of ethylene-based polymer and PAS (and optional additive) (hereafter the "PAS-PE compound") is collected, and cut into small pieces.

Mixing of the PAS-PE compound and the free radical initiator occurs by placing pieces of the PAS-PE compound and peroxide (and optionally antioxidant(s)) into a container. The container is subsequently shaken, rotated, tumbled, or otherwise agitated so that the peroxide contacts and is retained by, or otherwise the peroxide is absorbed into, the pieces of the PAS-PE compound. The process includes heating the mixture of the PAS-PE compound and the peroxide at a temperature from 60° C., or 70° C., or 80° C. to 90° C., or 100° C. or otherwise heating at a temperature greater than the melting temperature of peroxide. Heating of the mixture occurs for a duration from 1 minute, or 10 minutes, or 30 minutes to 1 hour, or 2 hours, or 3 hours, or 4 hours, or 5 hours, or 6 hours, or 7 hours, or 8 hours, thereby enabling the peroxide to diffuse into the PAS-PE compound pellets.

In an embodiment, the mixing and the heating occur sequentially.

In an embodiment, the mixing and the heating occur simultaneously.

The peroxide-containing PAS-PE pieces are cured (i.e., "crosslinked") by heating at a curing temperature from greater than 100° C., or 110° C., or 125° C. to 150° C., or 180° C., or 200° C. for a duration from 1 minute, or 5 minutes, or 10 minutes, or 30 minutes, or 1 hour to 2 hours, or 5 hours, or 7 hours, or more to form a crosslinked composition composed of the ethylene-based polymer, the PAS, and optional additives. The crosslinked composition is structurally and physically distinct to the crosslinkable composition.

2. Crosslinked Composition

In an embodiment, a crosslinked composition is provided. The crosslinked composition includes an ethylene-based polymer, a polyaminosiloxane (PAS), and optional additives. The polyaminosiloxane (PAS) has the Formula (I)

$$[RSi(OZ)_2O_{1/2}]_q[RSi(OZ)O_{2/2}]_m[RSiO_{3/2}]_n$$

wherein

- R is a $C_6$-$C_{20}$ aminoalkyl group with a phenyl moiety,
- Si is a silicon atom,
- O is an oxygen atom,
- Z is a hydrogen atom or a $C_1$-$C_{10}$ hydrocarbonyl,
- q is an integer from 2 to 1,000,000, or q is an integer from 5 to 100,
- m is an integer from 2 to 1,000,000, or m is an integer from 20 to 300,
- n is an integer from 2 to 1,000,000, or n is an integer from 10 to 700,
- 1/2 denotes an end block structure of Formula (II)

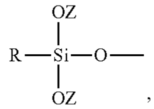

,

2/2 denotes a linear structure of Formula (III),

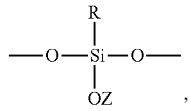

, and

3/2 denotes a branched structure of Formula (IV)

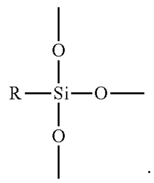

.

The ethylene-based polymer in the crosslinked composition can be any ethylene-based polymer in the crosslinkable composition as previously disclosed herein. In an embodiment, the ethylene-based polymer of the crosslinked composition is an LDPE ethylene homopolymer having a density from 0.91 g/cc to 0.93 g/cc, and a melt index from 0.5 g/10 min to 5.0 g/10 min.

The polyaminosiloxane (PAS) of Formula (I) present in the crosslinked composition is the polymerization reaction product of an aminoalkylsilane precursor. Nonlimiting examples of suitable aminoalkylsilane precursors for the production of the PAS of Formula (I) include phenylaminomethyl)methyldimethoxysilane (CAS:17890-10-7), (aminoethylaminomethyl)phenethyltrimethoxysilane (CAS: 74113-77-2), p-aminophenyltrimethoxysilane (CAS:33976-43-1), 3-(2,4-dinitrophenylamino)propyltriethoxysilane (CAS:71783-41-0), n-phenylaminomethyltriethoxysilane (CAS:77855-73-3), n-phenylaminopropyltrimethoxysilane (CAS:3068-76-6), m-aminophenyltrimethoxysilane (CAS: 70411-42-6), aminophenyltrimethoxysilane (CAS:33976-43-1/70411-42-6), 3-(n-styrylmethyl-2-aminoethylamino) propyltrimethoxysilane hydrochloride (CAS:34937-00-3), 4-(trimethoxysilylethyl)benzyltrimethylammonium chloride, and combinations thereof.

In an embodiment, the polyaminosiloxane (PAS) of Formula (I) is the polymerization reaction product of an aminoalkylsilane precursor selected from n-phenylaminopropyltrimethoxysilane (CAS:3068-76-6) and aminophenyltrimethoxysilane (CAS:33976-43-1).

In an embodiment, the polyaminosiloxane (PAS) of Formula (I) is the polymerization reaction product of the aminoalkylsilane precursor phenylaminopropyltrimethoxysilane (CAS:3068-76-6).

In an embodiment, the polyaminosiloxane (PAS) of Formula (I) is the polymerization reaction product of the aminoalkylsilane precursor aminophenyltrimethoxysilane (CAS:33976-43-1).

In an embodiment, the crosslinked composition includes from 90 wt % to 99.9 wt %, or from 90 wt % to 99 wt %, or from 95 wt % to 99 wt % of the ethylene-based polymer;

from 0.1 wt % to 1.0 wt %, or from 0.1 wt % to 0.9 wt %, or from 0.3 wt % to 0.9 wt % of the PAS of Formula (I); and the crosslinked composition has an average WTL from 3% to 12%, or from 5% to 10%. In a further embodiment, the PAS of Formula (I) is the polymerization reaction product of phenylaminopropyltrimethoxysilane (CAS:3068-76-6). In yet a further embodiment, the PAS of Formula (I) is the polymerization reaction product of aminophenyltrimethoxysilane (CAS:33976-43-1). It is understood that the aggregate of the ethylene-based polymer, the PAS of Formula (I), and optional additives amount to 100 wt % of the crosslinked composition.

The present crosslinked composition may include one or more optional additives. When the additive is present in the crosslinked composition, the additive can be any additive as in the crosslinkable composition as previously disclosed herein.

Applications

The crosslinked composition may be employed in a variety of applications including, but not limited to, wire and cable applications, such as an insulation layer for MV/HV/EHV cable for AC (alternating current) and DC (direct current), a semi-conductive layer filled with carbon black for MV/HV/EHV cable, an accessory for a power distribution transmission line, an insulation layer, an insulation encapsulation film for a photovoltaic (PV) module, and combinations thereof.

By way of example, and not limitation, some embodiments of the present disclosure will now be described in detail in the following examples.

EXAMPLES

Materials used in the examples are set forth in Table 1 below.

TABLE 1

| Component | Structure | Supplier |
|---|---|---|
| Dicumyl peroxide (DCP, CAS: 80-43-3) | 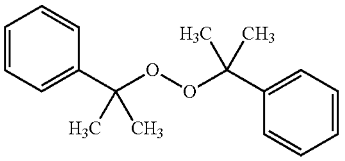 [SMILES: CC(C)(OOC(C)(C)c1ccccc1)c1ccccc1] | Fangruida |
| LDPE1 (density: 0.92 g/cc; melt index: 2.0 g/10 min) | Ethylene homopolymer | Dow |
| 4,4'-Thiobis(6-tert-butyl-m-cresol) (TBM-6, CAS: 96-69-5) | 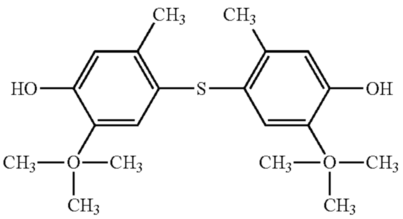 | TCl |
| Cyanox DSTDP (CAS: 693-36-7) | 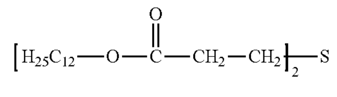 | Cytec Solvay Group |

TABLE 1-continued

| Component | Structure | Supplier |
|---|---|---|
| Cyanox 1790 (CAS: 40601-76-1) | 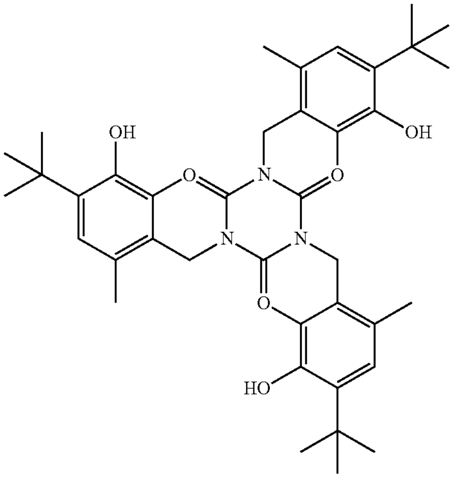 | Cytec Solvay Group |
| Uvinul 4050 (CAS: 124172-53-8) | 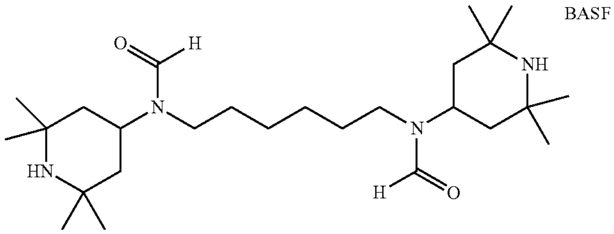 | BASF |
| Polydimethylsiloxane (PDMS) (Viscosity: 100 $mm^2/s$, density: 0.960-0.970 $g/cm^3$) | $(CH_3)_3SiO(Si(CH_3)_2O)_nSi(CH_3)_3$ | Sinopharm Chemical Reagent Co., Ltd. |
| PAPTMS Trimethoxy[3-(phenylamino)propyl]silane (CAS: 3068-76-6) | 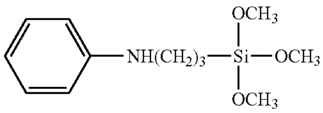 | TCl |
| p-APTMS AMINOPHENYLTRIMETHOXYSILANE (CAS: 33976-43-1 ) | 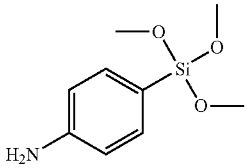 | Gelest |

1. Preparation of Polyaminosiloxane (PAS)

20 g PAPTMS was added into a 100 mL round-bottom flask, then 20 mL water was added, and the mixture was stirred at 80° C. for seven days. The water was removed, yielding polyaminosiloxane 1 (PAS1) having Formula (I).

20 g p-APTMS was added into a 100 mL round-bottom flask, then 20 mL water was added, and the mixture was stirred at 80° C. for seven days. The water was removed yielding polyaminosiloxane 2 (PAS2) having Formula (I).

Properties for PAS1 and PAS2 are provided in Table 2 below.

TABLE 2

| | PAS1 (condensation product of PAPTMS) | PAS2 (condensation product of p-APTMS) |
|---|---|---|
| FT-IR | Si—O—$CH_3$ absorption at 2850 $cm^{-1}$ elimination, new Si—O—Si absorption at 1050 $cm^{-1}$. | Not measured |
| GPC | GPC: PS equivalent Mw 18282, Mw/Mn: 9.2 | GPC: PMMA equivalent Mw 5891, Mw/Mn: 1.5. |
| $^{29}$Si NMR | $^{29}$Si NMR in $CDCl_3$: −50 ppm ($RSi(OZ)_2O_{1/2}$), −58 ppm ($RSi(OZ)O_{2/2}$), −68 ppm ($RSiO_{3/2}$). | $^{29}$Si NMR in d-DMSO: −61 ppm ($RSi(OZ)_2O_{1/2}$), −70 ppm ($RSi(OZ)O_{2/2}$), −78 ppm ($RSiO_{3/2}$). |
| $^{13}$C NMR | $^{13}$C NMR in $CDCl_3$: 149 ppm, 129 ppm, 116 ppm, 113 ppm, 50 ppm (OMe), 45 ppm, 22 ppm, 9 ppm ($SiCH_2$) | $^{13}$C NMR in d-DMSO: 150 ppm, 135 ppm, 118 ppm, 114 ppm, 50 ppm (OMe). |

TABLE 2-continued

| | PAS1 (condensation product of PAPTMS) | PAS2 (condensation product of p-APTMS) |
|---|---|---|
| q/m/n* —OH/—OMe | q/m/n = 1.3/2.0/6.7 —OH/—OMe = 4.3/1.1 | q/m/n = 0.6/4.0/5.4 —OH/—OMe = 4.3/1.1 |

*q/m/n ratio calculated from $^{29}Si$ NMR, integrated the peak areas of $(RSi(OZ)_2O_{1/2})$, $(RSi(OZ)O_{2/2})$ and $(RSiO_{3/2})$, then normalized the ratio.

2. Compounding

LDPE1 pellets were fed into the Brabender mixer at set temperature of 160° C. with a rotor speed of 10 rpm. Antioxidants and component(s) were fed into the polymer melt at the set temperature to form individual samples with different component(s) from Table 1. Final mixing was operated at the set temperature and a rotor speed of 45 rpm for 4 minutes. The compound was collected, and cut into small pieces for use.

3. Pelletizing

The compound samples were fed into the hopper of Brabender single extruder. The compound samples were extruded to melt strand at 120° C. with a screw speed of 25 rpm. The melt strand was fed into the Brabender Pelletizer to prepare the pellets.

4. Soaking

A 250 mL fluorinated HDPE bottle was applied to seal 50 g pellets and 0.865 g DCP. The bottle was sealed tightly. Soaking was conducted at 70° C. for 8 hours. The bottle was shaken every 0, 2, 5, 10, 20, 30 minutes in the soaking process. The pellets soaked with DCP (XLPE pellets) were stored in the fluorinated bottle for testing after soaking process.

5. Hot Press Curing of XLPE Plaque

The mold size/plaque sample size was 180×190×0.5 mm. 15 g XLPE pellets were weighted and sandwiched between two 2 mm PET films. The pellets and PET films were put into the mold. The mold was sandwiched between the upper and lower plates of hot press machine and mold for 10 minutes at 120° C. and 0 MPa for preheating. The temperature was heated up from 120° C. to 180° C. within 7 minutes at 10 MPa for curing. The mold was held at 120° C. and 5 MPa for 0.5 minutes. The mold was held at 120° C. and 10 MPa for 0.5 minutes. After venting for 8 times, the mold was held for 13 minutes at 180° C. and 10 MPa for curing. The mold was cooled from 180° C. to 60° C. within 10 minutes at 10 MPa. The XLPE plaque was removed from the mold. Table 3 below provides the composition and properties for each individual sample.

TABLE 3

| Performance Evaluation Results | | | | | | | |
|---|---|---|---|---|---|---|---|
| | CS1 | CS2 | CS3 | IE 1 | IE 2 | IE 3 | IE 4 |
| Component | | | | | | | |
| LDPE1 (wt. %) | 98.22 | 95.93 | 97.93 | 97.92 | 97.62 | 97.32 | 97.62 |
| TBM-6 (wt. %) | 0.08 | — | — | 0.08 | 0.08 | 0.08 | 0.08 |
| Cyanox DSTDP (wt. %) | — | 0.23 | 0.23 | — | — | — | — |
| Cynaox 1790 (wt. %) | — | 0.14 | 0.14 | — | — | — | — |
| Uvinul 4050 (wt. %) | — | 0.003 | 0.003 | — | — | — | — |
| DCP (wt. %) | 1.70 | 1.70 | 1.70 | 1.70 | 1.70 | 1.70 | 1.70 |
| PDMS (wt. %) | — | 2.00 | — | — | — | — | — |
| PAS-1 (wt. %) | — | — | — | 0.30 | 0.60 | 0.90 | — |
| PAS-2 (wt. %) | — | — | — | — | — | — | 0.60 |
| Results | | | | | | | |
| Average WTL (%) | 28.08 | 13.55 | 23.90 | 9.04 | 6.45 | 5.32 | 9.87 |
| ML/180° C. (dNm) | 0.22 | 0.21 | 0.22 | 0.22 | 0.23 | 0.22 | 0.23 |
| MH/180° C. (dNm) | 4.77 | 3.84 | 3.29 | 4.48 | 4.39 | 4.36 | 5.08 |
| MH − ML/180° C. (dNm) | 4.55 | 3.63 | 3.07 | 4.26 | 4.16 | 4.14 | 4.85 |
| ts1/180° C. (min) | 1.00 | 1.19 | 1.39 | 1.01 | 1.07 | 1.06 | 1.00 |
| t90/180° C. (min) | 4.48 | 4.59 | 4.71 | 4.32 | 4.37 | 4.30 | 4.28 |

CS = comparative sample;
IE = inventive example

Table 3 shows water tree length (WTL) of IEs 1-4 is lower than the WTL for CS1-3. IEs 1-4 have a WTL ranging from 5.3% to 9.9% compared to CS 1-3 WTL ranging from 13.55-28.08; signifying improvement in water tree retardancy for IE1-4 compared to CS1-3. Noteworthy is CS2 has more than two times the amount of conventional water tree retardant (PDMS at 2.00 wt %) compared to the amount of water tree retardant in IE1-4 (PAS1 or PAS2 at 0.3-0.9 wt %) yet CS2 has a WTL value of 13.55%, which is greater than the WTL for IE1-4, 5.3% to 9.9%.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A crosslinkable composition comprising:

an ethylene-based polymer;

a polyaminosiloxane (PAS) having the Formula (I)

$$[RSi(OZ)_2O_{1/2}]_q[RSi(OZ)O_{2/2}]_m[RSiO_{3/2}]_n$$

wherein

R is a $C_6$-$C_{20}$ aminoalkyl group with a phenyl moiety,

Si is a silicon atom,

O is an oxygen atom,

Z is a hydrogen atom or a $C_1$-$C_{10}$ hydrocarbonyl group, q, m, and n each individually is an integer from 2 to 1,000,000; and 1/2 denotes an end block structure of Formula (II)

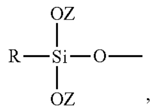
,

2/2 denotes a linear structure of Formula (III)

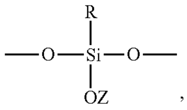
,

3/2 denotes a branched structure of Formula (IV)

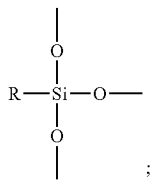
;

and optionally a peroxide.

2. The crosslinkable composition of claim 1 wherein the ethylene-based polymer has a density from 0.91 g/cc to 0.93 g/cc; and a melt index from 0.5 g/10 min to 5.0 g/10 min.

3. The crosslinkable composition of claim 1 comprising from 80 wt % to 99 wt % of the ethylene-based polymer; from 0.05 wt % to 3 wt % of the polyaminosiloxane; and from greater than 0 wt % to less than 2 wt % peroxide.

4. The crosslinkable composition of claim 1 comprising an additive selected from the group consisting of an antioxidant, a scorch retardant, a coagent, a nucleating agent, a processing aid, an extender oil, carbon black, nanoparticles, a UV stabilizer, and combinations thereof.

5. A crosslinked composition comprising:

an ethylene-based polymer;

a polyaminosiloxane (PAS) having the Formula (I)

$$[RSi(OZ)_2O_{1/2}]_q[RSi(OZ)O_{2/2}]_m[RSiO_{3/2}]_n$$

wherein

R is a $C_6$-$C_{20}$ aminoalkyl group with a phenyl moiety,

Si is a silicon atom,

O is an oxygen atom,

Z is a hydrogen atom or a $C_1$-$C_{10}$ hydrocarbonyl group, q, m, and n each individually is an integer from 2 to 1,000,000; and 1/2 denotes an end block structure of Formula (II)

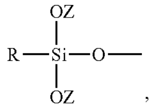
,

2/2 denotes a linear structure of Formula (III)

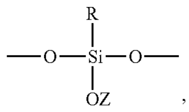
, and

3/2 denotes a branched structure of Formula (IV)

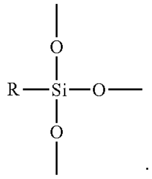
.

6. The crosslinked composition of claim 5 wherein the ethylene-based polymer has a density from 0.91 g/cc to 0.93 g/cc; and a melt index from 0.5 g/10 min to 5.0 g/10 min.

7. The crosslinked composition of claim 5 comprising an additive selected from the group consisting of an antioxidant, a scorch retardant, a coagent, a nucleating agent, a processing aid, an extender oil, carbon black, nanoparticles, a UV stabilizer, and combinations thereof.

8. The crosslinked composition of claim 5 comprising from 90 wt % to 99 wt % of the ethylene-based polymer;

from 0.1 wt % to 1.0 wt % of the PAS; and the crosslinked composition has an average WTL from 3% to 12%.

9. The crosslinked composition of claim 8 wherein the PAS of Formula (I) is the polymerization reaction product of phenylaminopropyltrimethoxysilane.

10. The crosslinked composition of claim 8 wherein the PAS of Formula (I) is the polymerization reaction product of aminophenyltrimethoxysilane.

* * * * *